No. 764,589.  
Patented July 12, 1904.

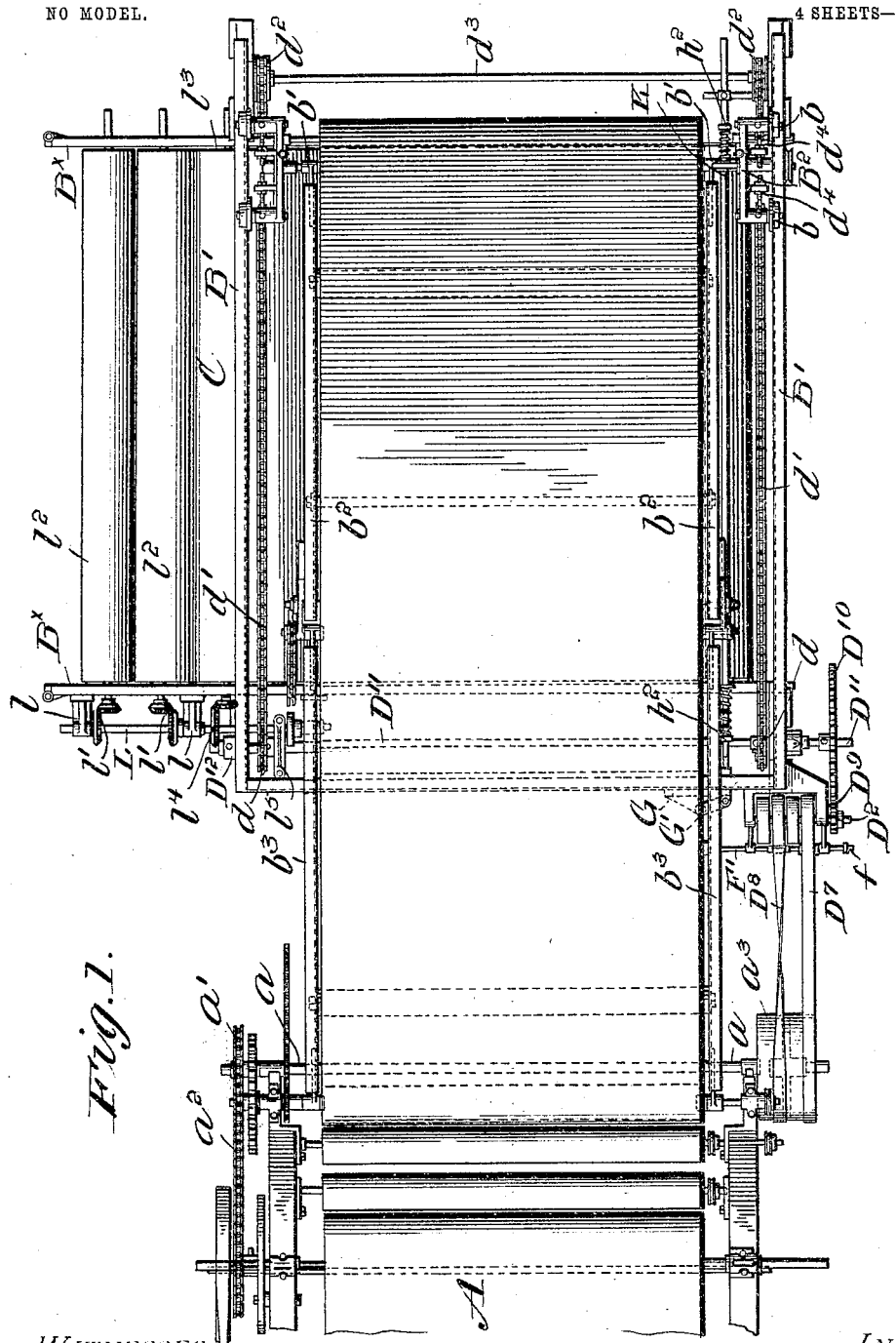

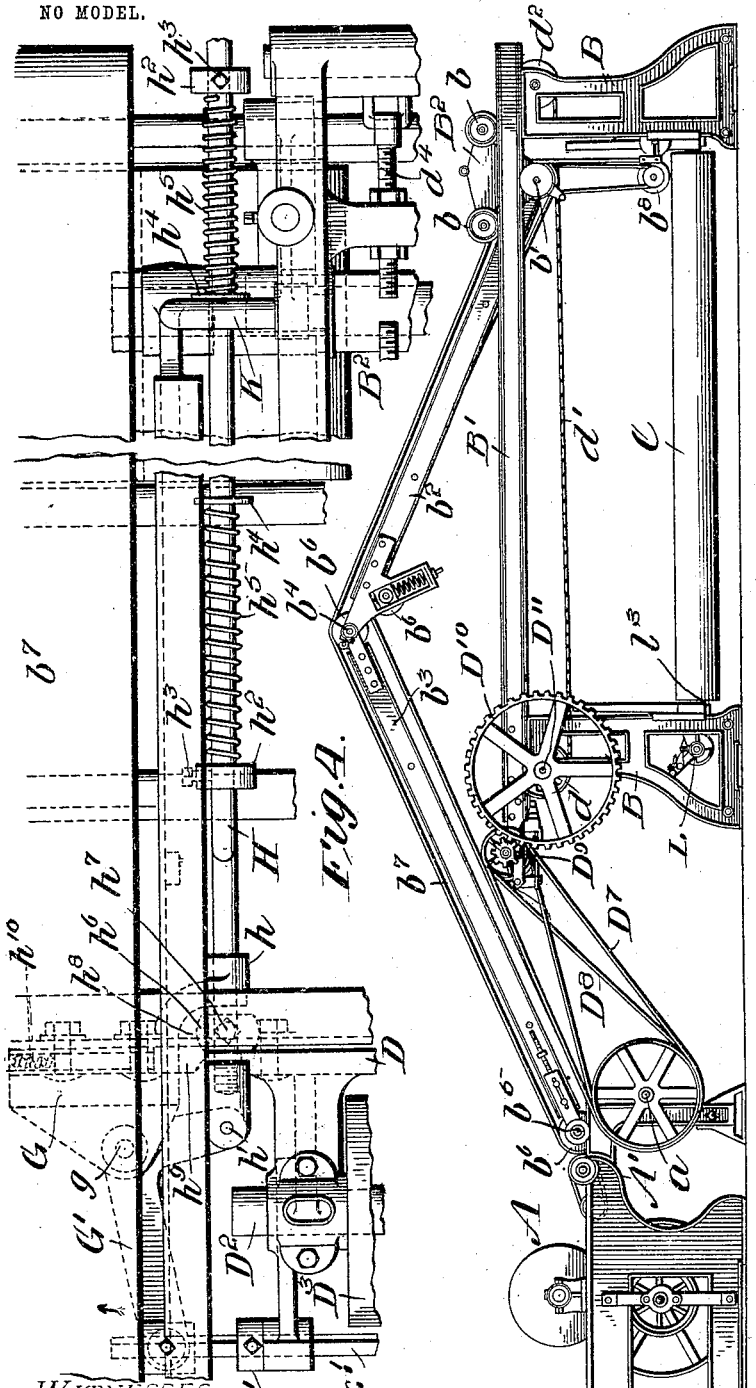

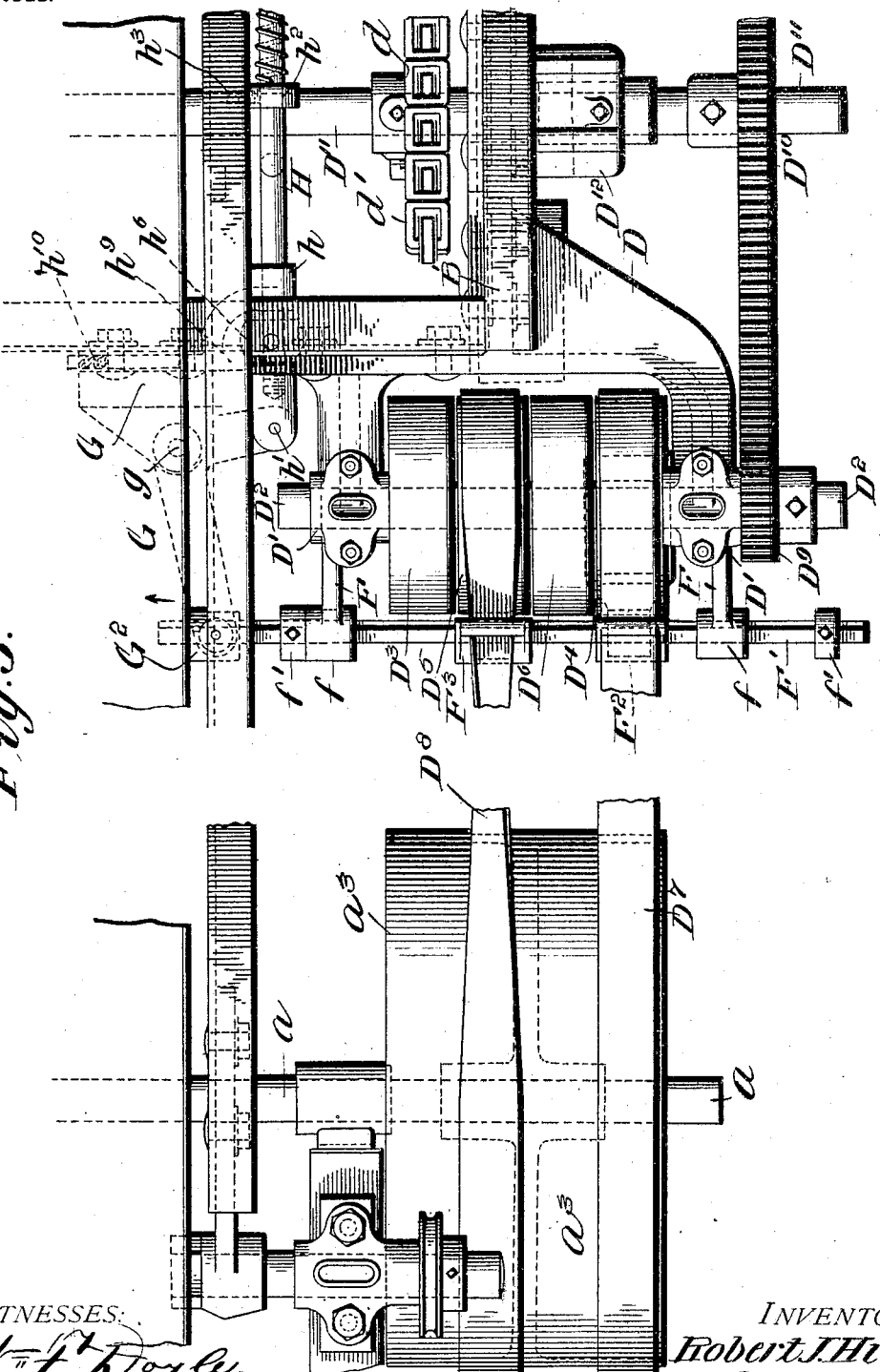

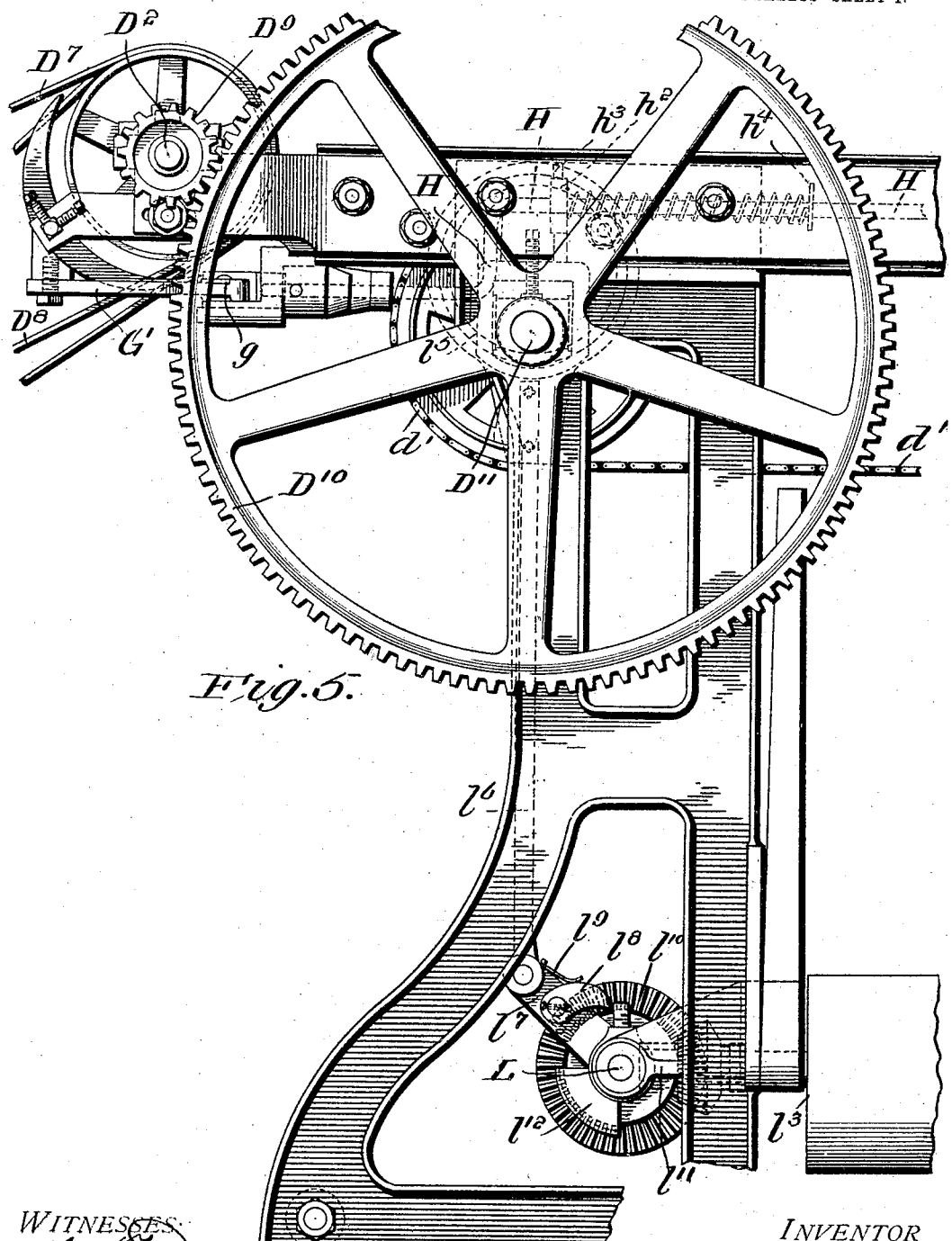

UNITED STATES PATENT OFFICE.

ROBERT J. HILL, OF CAMDEN, NEW JERSEY, ASSIGNOR TO JAMES SMITH WOOLEN MACHINERY COMPANY, A CORPORATION OF PENNSYLVANIA.

LAPPING-MACHINE.

SPECIFICATION forming part of Letters Patent No. 764,589, dated July 12, 1904.

Application filed August 20, 1903. Serial No. 170,160. (No model.)

*To all whom it may concern:*

Be it known that I, ROBERT J. HILL, a citizen of the United States, residing at Camden, in the county of Camden and State of New Jersey, have invented certain new and useful Improvements in Lapping-Machines, of which the following is a specification.

The invention to be hereinafter described relates to lapping-machines, and more particularly to that type operating on the well-known "camel-back" principle, in which a carriage movable upon a suitable supporting-frame lays a series of successive laps of fiber upon a transversely-moving apron, the present invention being an improvement in certain features, to be hereinafter set forth, of my prior patent, No. 723,272, dated March 24, 1903.

In my prior patent referred to the carriage for laying the laps of fiber upon the transversely-moving apron was actuated in its reciprocating movement by means of an endless belt or chain with which engaged pins mounted upon the carriage, the upper run of the belt giving movement to the carriage in one direction and the lower run of the belt giving movement of the carriage in the opposite direction. Thus at all times the travel of the carriage in its reciprocating movement was substantially the same, being governed by the length of the belt. It is desirable in this class of devices, however, that the carriage be susceptible of adjustment as to its length of travel, so that the reciprocating strokes for laying the laps of fiber upon the transverse belt or conveyer may be altered from time to time to suit the varying conditions of use and to enable the lengths of laps placed upon the transverse belt or conveyer to be changed in accordance with the uniform character of lap desired.

The objects of the present invention are to provide, in a machine of the general character referred to, means hereinafter described and claimed whereby the length of the travel of the carriage may be readily adjusted while the machine is in operation, in which also the path of travel of the carriage may be readily changed without variation of the length of its travel, and which will enable the stock to be deposited upon the transverse apron or conveyer with more uniformity than heretofore.

With these generally-stated objects in view the invention consists of the parts and combinations, which will be hereinafter more fully described, and definitely pointed out in the claims.

Referring to the drawings, Figure 1 is a plan view of one embodiment of my invention, some of the parts of the machine being omitted and others broken away to more fully and clearly show the relation of the salient features of the structure. Fig. 2 is a side elevation of the device shown by Fig. 1 to more clearly illustrate the general character and construction of the parts and their operative relation. Fig. 3 is an enlarged detail plan view of one side and end portion of the machine with parts broken away. Fig. 4 is an enlarged detail plan view of one side of the main supporting-frame and its connected parts, a portion of such frame and parts being broken away to more clearly show the general relation of others; and Fig. 5 is a side elevation in detail of one end portion of the machine, some of the parts being broken away.

The carding or garnet machine, from which the sheet of fiber is delivered to the camel-back lapper, may be of any usual or desired character and is generally designated in Figs. 1 and 2 by reference-letter A. Upon the frame A' of such carding or garnet machine A is suitably mounted the shaft $a$, carrying a sprocket or other wheel $a'$, which through suitable driving connection of any general character, as the belt $a^2$, derives motion from the carding or garnet machine, as more clearly seen in Fig. 1, the opposite end of the shaft $a$ carrying a broad-faced belt-pulley $a^3$.

The main supporting-frame of the lapper comprises suitable uprights B, connected by the beams or girders B', upon which travels the carriage B², said carriage being mounted upon suitable wheels $b$ $b$ and pivotally connected, as at $b'$, with the side supporting-bars $b^2$ $b^2$ of the camel-back, which are themselves jointed to the forward bars $b^3$ $b^3$ of the camel-back at $b^4$. The forward bars $b^3$ $b^3$ of the camel-back are pivotally connected to the frame A' at $b^5$, suitable supporting and actuating rolls $b^6$ $b^6$ being provided, as is usual in such devices, for an apron or conveyer $b^7$, by which the sheet of fibrous material delivered from the carding or garnet machine is carried to the transverse conveyer C through the feed-rolls $b^8$. The construction thus far described may be of any of the usual forms and constructions of such devices or as described in my prior patent referred to, and as such camel-back as thus far described forms no part of my present invention further elucidation and illustration thereof is unnecessary, it being only essential that a suitable form of camel-back be employed to carry the lap or sheet of fiber from the carding or garnet machine to the feed-rolls $b^8$, by which such lap or sheet is laid back and forth upon the transverse apron or conveyer C.

Mounted upon the main supporting-frame of the lapper (see Figs. 1, 3, and 4) is a supporting-bracket D, having the bearings D' D', in which is journaled the change-motion shaft $D^2$, carrying two fast belt-pulleys $D^3$ $D^4$ and the two loose belt-pulleys $D^5$ $D^6$, said pulleys being connected by an open belt $D^7$ and a crossed belt $D^8$ with the broad-faced pulley $a^3$. Suitably secured to rotate with the change-motion shaft $D^2$ is a gear or pinion $D^9$, having driving engagement with a gear or pinion $D^{10}$ on the chain-driving shaft $D^{11}$, carried in suitable bearings $D^{12}$ $D^{12}$ on the main supporting-frame of the lapper, said chain-driving shaft $D^{11}$ extending entirely across the frame, as indicated in Fig. 1 and for a purpose to be hereinafter described.

Fixed to rotate with the shaft $D^{11}$ are the chain-driving wheels $d$, one on each side of the main frame, and mounted to idly rotate in suitable bearings in the opposite end of the main supporting-frame is the shaft $d^3$, carrying the idle pulleys or wheels $d^2$. On each side of the main frame and passed around the chain-driving wheels $d$ and idle pulleys or wheels $d^2$ are the carriage-driving chains or belts $d'$ $d'$, the ends of said chains being connected to the carriage $B^2$ by means of the screw-bolts $d^4$. (See Figs. 1 and 4.)

From the construction so far described it will be evident that if motion is imparted to the carriage-driving chains $d'$ $d'$ by means of the chain-driving wheels carried by the chain-driving shaft $D^{11}$ said chains will impart to the carriage movement along the main supporting-frame, the feed-rolls $b^8$ at such times moving just above the surface of the transverse apron or conveyer C, and it will be equally obvious that the direction of movement of the carriage will be dependent upon the direction of rotation of the chain-driving shaft, which direction of rotation is controlled by the mechanism now to be described.

Extending from the bracket D (see Figs. 3 and 4) are the arms F F, carrying bearing $f$, in which slides the belt guide-rod F', provided with suitable belt-guides $F^2$ and $F^3$, one, as $F^2$, engaging the open belt $D^7$ and the other crossed belt $D^8$, adjustable stops $f'$ $f'$ being connected near opposite ends of the guide-rod F' to limit the sliding movement thereof.

Secured to the main supporting-frame is the lock-bracket G, having pivoted thereto at $g$ a shifting lever G', one arm of which is jointed to the fulcrum-collar $G^2$, which is itself secured to the belt guide-rod, as indicated in Figs. 3 and 4, whereby upon pivotal movement of the shifting lever the belt guide-rod will be moved to carry the open and crossed belts simultaneously onto different pulleys. For instance, starting with the belts disposed on the pulleys as indicated in Fig. 3—that is, with the open belt $D^7$ upon the tight pulley $D^4$ and the crossed belt upon the loose pulley $D^5$—it will be evident that the shaft $D^2$ will receive motion in one direction from the open belt, the crossed belt $D^8$ for the time being running idle, and upon movement of the shifting lever in the direction of the arrow, Fig. 3, it will be evident that both belts $D^7$ and $D^8$ will be simultaneously moved, the former from the tight pulley $D^4$ to the loose pulley $D^6$ and the latter from the loose pulley $D^5$ to the tight pulley $D^3$, thus reversing the rotatory motion of the shaft $D^2$ and through the gear connection $D^9$ and $D^{10}$ likewise reverse the direction of rotation of the chain-driving wheels $d$, and consequently the movement of the carriage $B^2$.

Mounted to slide in suitable bearings lengthwise of the main supporting-frame, one of which bearings is indicated at $h$, Figs. 3 and 4, is the shifting rod H, the end of said rod being jointed to one arm of the shifting lever G', as at $h'$, so that upon longitudinal movement of the shifting rod H the manipulation of the belts, as above indicated, may be secured. The rod H adjacent its end portions carries collars $h^2$ $h^2$, adjustable longitudinally on said rod and suitably secured thereto by set-screws $h^3$, Figs. 3 and 4. Also disposed upon the shifting rod are the loose or sliding collars $h^4$ $h^4$, and between each of the collars $h^2$ $h^4$ are the springs $h^5$. Near one end the shifting-rod H is acted upon by a trip-lock, comprising a trip-lug, preferably of the form shown in Figs. 3 and 4, and consisting of a collar $h^6$, adjustably secured to the rod H by means of a set-screw $h^7$, said collar having a rounded or curved exterior $h^8$, the other member of the trip-lock comprising a trip catch or plunger $h^9$, having a beveled end, as shown, adapted to engage the rounded or correspondingly-shaped exterior of the trip lug or collar $h^6$ on the shifting rod, the trip catch or plunger $h^9$ being preferably acted upon by a suitable spring $h^{10}$, whereby while normally pressed toward and into locking contact with the trip lug or collar $h^6$ said trip catch or plunger may upon application of sufficient force tending to move the trip-lug past the catch yield to allow the trip-lug to pass and then at once automatically engage the opposite side of the trip-lug. Thus it will be seen that with the parts of the trip-lock in engagement, as shown in Figs. 3 and 4, if sufficient force is applied to the shifting rod H, tending to move it to the left, the trip-catch will yield, permit the trip-lug to pass, and then engage the opposite side of the trip-lug to lock the parts in the new position, the stops $f'$ $f'$ on the belt guide-rod F' preventing overmovement of the shifting rod and serving, in connection with the trip-lock, to maintain the parts in proper position with the belts on the desired belt-pulleys. In order that the shifting of the trip-lock may be accomplished automatically at each reciprocation of the carriage $B^2$ to thereby shift the belts to cause a reverse travel of said carriage, the latter is provided with a trip-pin K, Figs. 1 and 4, which as the carriage moves over the supporting-frame travels upon the shifting rod H and engaging with one of the loose or sliding collars $h^4$ on said rod moves said collar and compresses the spring $h^5$ between it and one of the collars $h^2$ until the tension of said spring $h^5$ becomes sufficiently forcible to cause the trip-lug $h^6$ to push back the trip-catch $h^9$, whereupon the trip-lug snaps past the catch, thereby permitting the shifting rod H to move and effect the desired shifting of the open and closed belts and cause reverse movement of the carriage-driving chains and carriage, as will be evident. By the adjustable character of the collars $h^2$ on the shifting rod H it is obvious that said collars may be so placed or adjusted upon the rod that the length of travel of the carriage in its reciprocations may be made longer or shorter, as desired, and from the character of the adjusting devices that such variations in the length of travel of the carriage may be readily effected while the machine is in operation. It is also desirable at times not only to vary the length of travel of the carriage, but to also change its path of travel, and this may be readily done either while the machine is at rest or during its operation by simply adjusting the relative positions of the collars $h^2$ $h^2$ on the shifting rod. For instance, adjustment of both collars $h^2$ $h^2$ toward one end of the shifting rod while maintaining them the same distance apart will change the path of travel of the carriage without changing the length of such travel. Other adjustments to suit the conditions of use will suggest themselves to one skilled in the art to secure from the machine a more uniform and even disposition of the lap placed upon the transverse apron or conveyer C.

Mounted in bearings $l$, secured to the extension $B^x$ of the main frame, is the winding-shaft L, provided with bevel-gear connections $l'$ $l'$ with the winding-rolls $l^2$ $l^2$, supported by said extensions $B^x$, whereby said rolls are rotated to properly wind the lap delivered thereto by the transverse apron or conveyer C, carried by rolls $l^3$ $l^3$ and operated through the bevel-gear connection $l^4$ with the shaft L, as indicated in Fig. 1. The shaft $D^{11}$, near the end thereof opposite the gear or pinion $D^{10}$, carries the eccentric $l^5$, (see Fig. 1 and dotted lines, Fig. 5,) which actuates a suitable eccentric-rod $l^6$, Fig. 5, connected at its lower end to an arm $l^7$, mounted to swing upon the shaft L. Pivoted to the swinging arm $l^7$ is the pawl $l^8$, normally maintained in engagement with a ratchet-wheel $l^{10}$ on the shaft L by means of a spring $l^9$, whereby as the shaft $D^{11}$ is rotated the shaft L is given a step-by-step rotation to actuate the transverse apron or conveyer C and the winding-rolls $l^2$ $l^2$, as will be obvious. In order that the extent of step-by-step movement of the shaft L may be regulated to suit the character of fiber being treated or the lap to be formed, there is secured to the bearing $l^{11}$ of the shaft L a shield or guard $l^{12}$, which may be adjusted to cause the pawl $l^8$ to engage more or less of the ratchet-teeth wheel $l^{10}$, Fig. 5.

While I have shown and described a general form of camel-back lapper to which my invention has been applied and while I have in detail shown and described a specific means in connection therewith as the embodiment of my present invention thus applied, it is to be understood, of course, that many variations may be made in these parts without departing from the spirit of my invention.

Other forms of trip-lock for permitting endwise movement of the shifting rod H and then locking it automatically in its new position will readily suggest themselves to one skilled in the art, and I do not wish to be understood as specifically limiting myself to the form of such parts selected to illustrate the application of my invention.

Having thus described my invention, what I claim, and desire to secure by Letters Patent, is—

1. In a lapping-machine, the combination of a supporting-frame, the carriage of a camel-back lapper movable thereon, a transverse apron or conveyer, means for moving the carriage upon said frame, a shifting rod controlling the direction of operation of said means and having adjustable and sliding collars thereon, springs disposed between the adjustable and sliding collars, a pin or stud mounted upon the carriage and adapted to act upon said sliding collars to thereby move the shifting rod and change the direction of action of said means, a trip-lock for holding the shifting rod in position, adjustment of the collars upon the rod effecting a change in the time of action of the pin or stud to vary the length of travel of the carriage.

2. In a lapping-machine, the combination of a supporting-frame, the carriage of a camel-back lapper movable thereon, a transverse apron or conveyer for receiving the laps of fibrous material from said carriage, means for moving the carriage upon said frame, said means comprising a change-motion shaft, means for rotating said shaft in different directions, carriage-driving chains in operative connection with said shaft, a shifting rod for controlling the direction of rotation of said shaft, a trip-lock for holding said rod in position to which it may be moved, a pin or stud upon the carriage, and elastic devices carried by the shifting rod and adapted to be engaged by said pin or stud to move the shifting rod and change the direction of rotation of the change-motion shaft.

3. In a camel-back lapping-machine, the combination of a supporting-frame, a carriage movable thereon, means for moving the carriage upon the supporting-frame, a transverse apron or conveyer to receive the fibrous material from the camel-back, a shifting rod for controlling the direction of motion of said means, a trip-lug on said shifting rod, a trip-catch for engaging the trip-lug to hold the shifting rod in the position to which it has been moved, adjustable and loose collars on said shifting rod, yielding means interposed between the said collars, and devices mounted on the carriage to engage the loose collar and compress the yielding means to cause the trip-lug to snap past the trip-catch and cause a change in the direction of rotation of said means for moving the carriage.

4. In a camel-back lapping-machine, the combination of a supporting-frame, the carriage of the camel-back lapper movable thereon, a transverse apron or conveyer for receiving the fibrous material from the camel-back, a chain or belt connected to the carriage, a change-motion shaft for driving said chain or belt and having fast and loose pulleys thereon, driving-belts for engagement with said fast and loose pulleys, a belt-shipper, a shifting rod connected to the belt-shipper, a trip-lock for holding the shifting rod in position to which it may be moved, spring-held collars mounted upon said shifting rod, and means mounted upon the carriage for engagement with the said adjustable collars for moving the shifting rod and thereby shipping the belts to cause reverse movement of the change-motion shaft and carriage, adjustment of said collars upon the shifting rod determining the length and path of movement of the carriage.

5. In a camel-back lapping-machine, the combination of a supporting-frame, a carriage movable thereon, a chain connected to said carriage, a chain-driving shaft and means to drive said shaft first in one and then in the other direction to reciprocate the carriage upon the supporting-frame, a winding-shaft mounted upon the frame, winding-rolls operatively connected to said shaft, an eccentric on the chain-driving shaft, and means operative by said eccentric as the said shaft rotates in either of the two directions for operating the winding-shaft.

6. In a camel-back lapping-machine, the combination of a supporting-frame, a carriage movable thereon, a chain connected to said carriage, a chain-driving shaft and means to drive said shaft first in one and then in the other direction to reciprocate the carriage upon the supporting-frame, a winding-shaft mounted upon the frame, an eccentric on the chain-driving shaft, winding-rolls operatively connected to said shaft, a swinging arm operated by said eccentric, a pawl carried by said arm for turning the winding-shaft and means for adjusting the operative throw of the pawl to thereby regulate the movement of the winding shaft and rolls.

In testimony whereof I affix my signature in presence of two witnesses.

ROBERT J. HILL.

Witnesses:
C. C. McKEE,
A. FLORENCE YERGER.